US006252763B1

(12) United States Patent
Enokida et al.

(10) Patent No.: US 6,252,763 B1
(45) Date of Patent: Jun. 26, 2001

(54) GAS-INSULATED ELECTRICAL APPARATUS

(75) Inventors: Yoshikatsu Enokida; Tokio Yamagiwa; Kenji Annou; Manabu Takamoto; Hirohiko Yatsuzuka, all of Hitachi; Masahiro Shimokawa, Juo-machi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/434,284

(22) Filed: Nov. 5, 1999

(30) Foreign Application Priority Data

Nov. 9, 1998 (JP) .................................................. 10-317216

(51) Int. Cl.[7] ........................................................ H02B 1/04
(52) U.S. Cl. ............................................ 361/604; 218/618
(58) Field of Search ............................ 361/62, 602–604, 361/605, 611, 612, 618; 218/6, 12; 200/275, 279

(56) References Cited

U.S. PATENT DOCUMENTS 4,360,849 * 11/1982 Harris .
4,506,119 * 3/1985 Tanabe ................................ 200/16 C
4,521,654 * 6/1985 Eberhadt .
4,543,455 * 9/1985 Pollerspock .
4,644,442 * 2/1987 Ponsioen .
4,890,193 * 12/1989 Tsubaki .
4,973,806 * 11/1990 Kirchesch .
5,898,565 * 4/1999 Yamauchi .

FOREIGN PATENT DOCUMENTS 2-44620 2/1990 (JP) .

* cited by examiner

*Primary Examiner*—G P Tolin
(74) *Attorney, Agent, or Firm*—Mattingly, Stanger & Malur, P.C.

(57) ABSTRACT

A gas-insulated electrical apparatus includes tanks into each of which insulation gas is sealed, including bus-bars, bus-bar disconnectors connected to the bus-bars, circuit breakers connected to the bus-bar disconnectors, and line disconnectors connected to the circuit breakers, each line disconnector being further connected to a transmission or a transformer; wherein each bus-bar disconnector and each line disconnector include a respective pair of a fixed-contact and a moving-contact, the fixed-contact and the moving-contact being concave and convex, respectively, and each of the moving-contacts in the bus-bar disconnector and the line disconnector is located at the side of a corresponding circuit breaker between the bus-bar disconnector and the line disconnector, a contact-parting speed in the line connector being lower than that in the bus-bar disconnector.

7 Claims, 4 Drawing Sheets

GAS-INSULATED ELECTRICAL APPARATUS

BACKGROUND OF THE INVENTION

The present invention relates to a gas-insulated electrical apparatus, and especially to a gas-insulated electrical apparatus suitable for an electric power substation or a switching station, which is capable of reducing DC residual voltage and preventing an insulation breakdown.

A gas-insulated electrical apparatus is composed of bus-bars contained in tanks into which insulation gas is sealed, bus-bar disconnectors, circuit breakers, and line circuit breakers, and is connected to transmission-lines or transformers via bushings.

Each bus-bar circuit breaker and each line circuit breaker perform a charging-current interruption which interrupts power fed to a capacitive load by voltage-interruption between a fixed-contact and a moving-contact which are included each circuit breaker, which is carried out by parting the moving-contact from the fixed-contact, and perform a loop-current interruption in which a current-flowing route is switched by communicating the current-flowing route by means of arch-discharging. However, while the moving-contact is parted from the fixed-contact, the re-ignition of arc occurs, which causes a surge of voltage.

As an apparatus which is capable of reducing a surge voltage while parting a moving-contact from a fixed-contact by preventing the re-ignition phenomenon occurring during the charging-current interruption, Japanese Patent Application Laid-Open Hei 2-44620 discloses an apparatus in which an auxiliary moving-contact is provided in a main moving-contact, a pressing member which moves in accordance with motion of the main moving-contact presses a pressed member located in a drive member for driving the auxiliary moving-contact, and the pressed member further presses the drive member.

In the conventional gas-insulated electrical apparatus, when an opening operation is performed, at first, a moving-contact in a circuit breaker is parted from a fixed-contact to interrupt current. However, since the contact-parting speed is a high speed of the order of several m/s, the contact-parting operation (opening operation) is completed without the re-ignition between the fixed and moving-contacts. Next, a disconnector is opened, and the re-ignition of arc occurs during the opening operation of the disconnector, which causes surge-voltage. Further, DC voltage remains at high-voltage conductors in the circuit breaker and the disconnector. The level of this residual voltage depends on the structure of the disconnector and the contact-parting speed, and if the level of the residual voltage is high, the insulation between the contacts of the disconnector may break down. In the worst case, a reverse-polarity DC residual voltage remains between the contacts, and its value is about 2 pu, where 1 pu is a peak value in the ordinary AC voltage to the ground level, and it is required that this residual voltage be decreased.

The residual voltage remaining between the circuit breaker and each disconnector due to the opening operation of the disconnector depends on the structure of the disconnector and the contact-parting speed in the disconnector. Since it is usually necessary to interrupt a bus-bar loop current, an electromotive spring operation method is adopted in the contact-parting operation of the disconnector, and the contact-parting speed is set at about 1–3 m/s. At the speed in this range, the re-ignition of arc is repeated between the tops of the fixed-contact and the moving-contact, and the insulation recovery voltage increases while the distance between the contacts increase. Thus, a large residual voltage of maximally 1 pu to the ground level and of maximally 2 pu between the contacts in the disconnector remains as a residual DC voltage after the opening operation of the disconnector has terminated.

Generally, in the insulation recovery voltage, the value of the insulation recovery voltage increases with respect to the distance between the contacts, and a positive voltage value is larger than a negative voltage value. Accordingly, a positive insulation recovery voltage remains after the opening operation has terminated. However, at a high contact-parting speed of about 1–3 m/s, the residual voltage becomes either positive or negative depending on the phase at the start of the contact-parting operation. Therefore, the residual voltage in the disconnector is large, and its polarity becomes one of the positive or negative polarity in the same probability. Thus, the insulation between the contacts, or between the conductors and the tank, probably breaks down.

If a conductor between the circuit breaker and each disconnector possesses a positive potential, a metallic extraneous substance in the tank reciprocates between the conductor and the inside surface of the tank, and it is highly probable that the charged extraneous substance adheres to the coated inside surface of the tank.

However, if a negative voltage remains between the circuit breaker and each disconnector, and the conductor possesses a negative potential, a floatable extraneous substance floats up and reaches the central conductor. Further, the extraneous substance also possesses a negative potential, and moves down due to the electrostatic repulsive-force and the gravity force. Furthermore, electrons are emitted from the extraneous substance due to local discharge during moving-down of the extraneous substance, and the polarity of the extraneous substance becomes positive. Finally, the extraneous substance is attracted by and adhered to the conductor. If there is an extraneous substance near a conductor with a high voltage, and a high voltage due to a thunder surge, etc., is applied to the extraneous substance and the conductor, discharging is induced by the extraneous substance, and a grounding accident possibly occurs.

SUMMARY OF THE INVENTION

The present invention has been achieved in consideration of the above problems, and is aimed at providing a highly reliable gas-insulated electrical apparatus which is capable of reducing a residual voltage generating between a circuit breaker and a disconnector, due to a contact-parting operation of the disconnector, and in which a grounding accident scarcely occurs even if there is an extraneous substance in a tank containing the disconnector.

To attain the above object, the present invention provides a gas-insulated electrical apparatus comprising:

tanks into each of which insulation gas is sealed including bus-bars, bus-bar disconnectors connected to the bus-bars, circuit breakers connected to the bus-bar disconnectors, and line disconnectors connected to the circuit breakers, each line disconnector being further connected to a transmission or a transformer;

wherein a contact-parting speed in each line disconnector is lower than that in each bus-bar disconnector.

Further, in the above gas-insulated electrical apparatus, each bus-bar disconnector and each line disconnector include respective pairs of a fixed-contact and a moving-contact, the fixed-contact in the bus-bar disconnector is located at the side of a corresponding bus-bar connected to the bus-bar disconnector, the moving-contact in the bus-bar disconnector is located at the side of a corresponding circuit breaker connected to the bus-bar disconnector via a connection bus-bar, the fixed-contact in the line disconnector is located at the side of a transmission line or a transformer connected to the line disconnector, and the moving-contact in the line disconnector is located at the side of a corresponding circuit breaker connected to the line disconnector.

Furthermore, in the above gas-insulated electrical apparatus, a moving-contact parting speed in each line disconnector is in a range of about 0.1–0.3 m/s.

Moreover, the present invention provides a gas-insulated electrical apparatus comprising:

tanks into each of which insulation gas is sealed including bus-bars, bus-bar disconnectors connected to the bus-bars, circuit breakers connected to the bus-bar disconnectors, and line disconnectors connected to the circuit breakers, each line disconnector being further connected to a transmission or a transformer;

wherein each bus-bar disconnector and each line disconnector include a respective pair of a fixed-contact and a moving-contact, the fixed-contact and the moving-contact being shaped as concave and convex, respectively, and each of the moving-contacts in the bus-bar disconnector and the line disconnector is located at the side of a corresponding circuit breaker between the bus-bar disconnector and the line disconnector.

Also, in the above gas-insulated electrical apparatus, the moving-contact in the bus-bar disconnector is driven by an electromotive spring operation device, and the moving-contact in the line disconnector is driven by a motor-driven contact operation device.

DETAILED DESCRIPTION OF THE EMBODIMENTS

Figure 1:
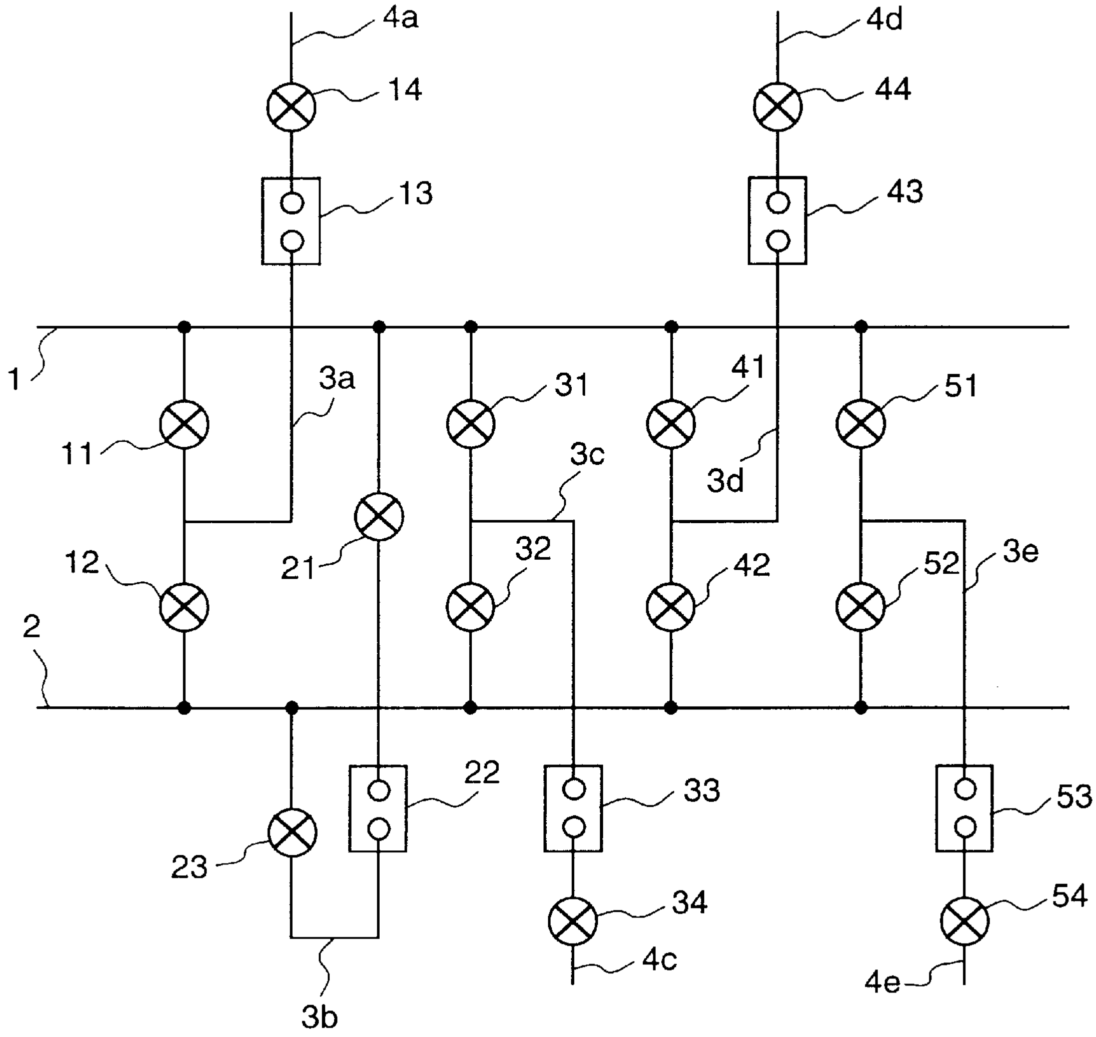
FIG. 1 is a single-line diagram showing the composition of a power substation or a switching station using a gas-insulated electrical apparatus of an embodiment according to the present invention.
Figure 2:
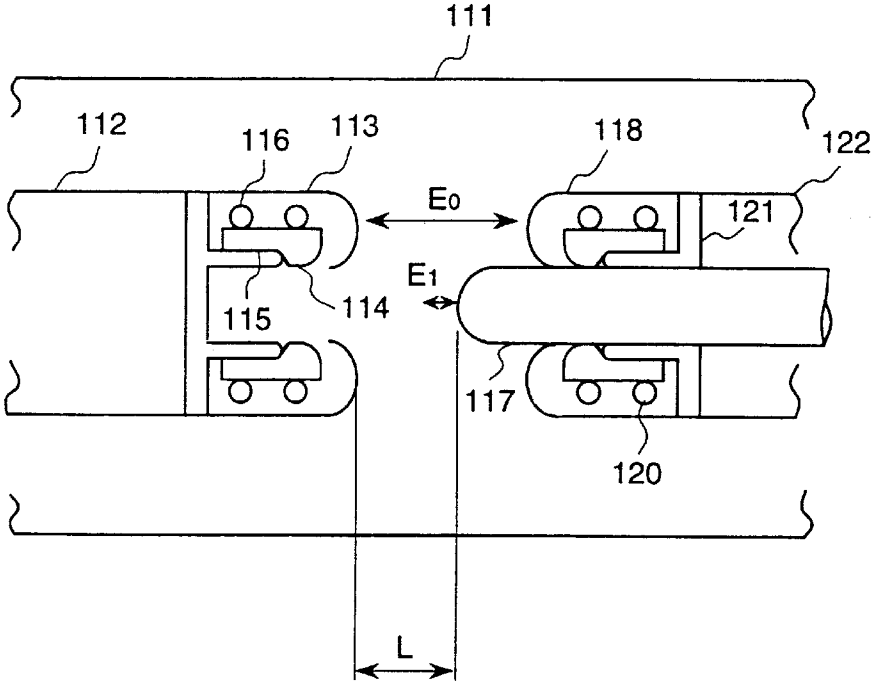
FIG. 2 is a vertical cross section showing the composition of each disconnector shown in FIG. 1.

Hereafter, details of the embodiments will be explained with reference to the drawings of FIG. 1–FIG. 6. FIG. 1 is a single-line diagram showing the composition of a power substation or a switching station using a gas-insulated electrical apparatus of an embodiment according to the present invention, and FIG. 2 is a vertical cross section showing the composition of each disconnector shown in FIG. 1. Here, grounding switches and trans comers are not shown in FIG. 1, and the explanation of those components is omitted.

As shown in FIG. 1, bus-bar disconnectors 11 and 12 are connected to bus-bars 1 and 2, respectively, and a circuit breaker 13 is connected between the disconnectors 11 and 12 via a connection bus-bar 3*a*. Further, a line disconnector 14 is connected to the circuit breaker 13 and a connection bus-bar 4*a* at the side of a transmission-line and a transformer which are not shown in this figure. A bus-bar communicating circuit is composed of bus-bar disconnectors 21 and 23, a connection bus-bar 3*b*, and a circuit breaker 22 connected to the bus-bars 1 and 2 via the bus-bar disconnectors 21 and 23, respectively, and the connection bus-bar 3*b*. Here, since connecting relations concerning bus-bar disconnectors 31, 32, 41, 42, 51, and 52, circuit breakers 33, 43, and 53, line disconnectors 34, 44, and 54, and connection bus-bars 3*c*, 3*d*, 3*e*, 4*e*, 4*d*, and 4*e* are the same as those of the above-described components, a detailed explanation of the connecting relations of these components is omitted.

In the composition of the above gas-insulated electrical apparatus, when it is used for a typical power transmission, the bus-bar 1, the bus-bar disconnector 11, the connection bus-bar 3*a*, the circuit breaker 13, the line disconnector 14, and the connection bus-bar 4*a* are serially connected to each other, and the bus-bar disconnector 12 is opened. When the circuit breaker 13 is opened, the bus-bar disconnector 11 and the line disconnector 14 are opened after the opening of the circuit breaker 13 has terminated. Thus, the power transmission is interrupted.

In the following, the composition and operations of each disconnector will be explained in detail with reference to FIG. 2. As shown in FIG. 2, a fixed-contact and a moving-contact are arranged in a tank body 111. The fixed-contact is composed of a fixed-contact-side conductor 112, a fixed-contact-side shield 113 and a fixed-part 115 attached to the top part of the fixed-contact-side conductor 112, and a fixed-contact-side contact part 114 attached to the fixed-part 115 with a fixture element 116, and its shape is concave. On the other hand, the moving-contact is composed of a moving-contact-side conductor 122, a moving-contact-side shield 118 and a fixed-part 121 attached to the top part of the moving-contact-side conductor 122, and a moving-contact-side contact part 117 attached to the fixed-part 121 with a fixture element 120, and its shape is convex. A charging current or a loop current is interrupted by parting the moving-contact-side contact part 117 from the fixed-contact-side contact part 114 which contacts the moving-contact-side contact part 117. When both the contacts 114 and 117 are contacting to each other, the contacts 114 and 117 are in the conducting state, and are at the same potential. In the event of opening the closed disconnector, the moving-contact-side contact part 117 is parted from the fixed-contact-side contact part 114, and the distance L between the moving-contact-side contact part 117 and the shield 113 is increased, while the re-ignition of arc is repeated. In FIG. 2, E1 is the voltage between the contact parts 114 and 117 at the distance L when the moving-contact-side contact part 117 stays between the fixed-contact-side shield 113 and the moving-contact-side shield 118, and E0 is the voltage between the contact parts 114 and 117 after the top of the moving-contact-side contact part 117 has been inserted into the moving-contact-side shield 118.

In this embodiment, a convex-shape moving-contact and a convex-shape fixed-contact such as that shown in FIG. 2 are used for a moving-contact and a fixed-contact of each of the bus-bar disconnectors 11 and 12, and the line disconnector 14 shown in FIG. 1. Further, the convex-shape moving-contact in each of the bus-bar disconnectors 11 and 12 is located at the side of the connection bus-bar 3*a* connected to the circuit breaker 13, and the concave-shape fixed-contacts in the bus-bar disconnectors 11 and 12, and the line disconnector 14 are located at the sides of the bus-bars 1 and 2, and the connection bus-bar 4*a* connected to a transmission line or a transformer not shown in FIG. 1, respectively. The above-mentioned arrangement manner of the paired moving and fixed-contacts in each of the above disconnectors is common to the bus-bar disconnectors 31, 32, 41, 42, 51, and the line disconnectors 34, 44, and 55. Furthermore, in the bus-bar communication circuits, the convex-shape moving-contacts in the bus-bar disconnectors 21 and 23 are located at the side of the circuit breaker 22 and the side of the connection bus-bar 3*b* connected to the circuit breaker 22, respectively. On the other hand, the concave-shape fixed-contacts in the bus-bar disconnectors 21 and 23 are located at the side of the bus-bar 2 and the side of the bus-bar 1, respectively.

An electromotive spring operation method is used for the disconnecting (opening) operation of the bus-bar disconnectors 11, 12, 21, 23, 31, 32, 41, 42, 51, and 52, and a loop current is interrupted at a contact-parting speed of about 1–3 m/s. On the other hand, in the line disconnectors 14, 34, 44, and 54, since it is not necessary to interrupt a loop current, an electric force operation method, such as a motor-driven-contact operation method, is used for the disconnection operation of these line disconnectors in this embodiment, and the disconnection operation of these line disconnectors is performed at the contact-parting speed of about 0.1–0.3 m/s, lower by one figure than that in the disconnection operation of each bus-bar disconnector.

Since it is necessary to interrupt a loop current in a bus-bar, a switching device using an electromotive spring operation method which can perform a switching operation at high speed is adopted for each of the bus-bar disconnectors. Further, by using a disconnector whose speed of opening operation is lower than that of the disconnector adopted for each bus-bar disconnector, for each of the line disconnectors, it has become possible to reduce the residual voltage which remains between each bus-bar disconnector and each line-disconnector. Moreover, although an expensive switching device using an electromotive spring operation method is used for a disconnector such as a bus-bar disconnector, of which a high-speed-opening operation is required, a cheaper switching device using an electric force operation method such as a motor-driven-contact operation method can be used for a disconnector such as a line disconnector, of which a high-speed-opening operation is not required.

In accordance with the above embodiment, since the moving-contact of each line disconnector is located at the side of a corresponding circuit breaker, and the shape of the moving-contact and the shape of the fixed-contact facing the moving-contact is convex and concave, respectively, the structure between the paired contacts is asymmetric, and this asymmetric structure generates an asymmetric electric field between the paired contacts, which can leave the polarity of the convex contact at which the electric field is centered as positive. Thus, it is possible to make the polarity of the conductor between each circuit breaker and a corresponding bus-bar disconnector, or between each circuit breaker and a corresponding line disconnector, positive.

Moreover, the residual voltage of each of the connection bus-bars 3*a*, 3*c*, 3*d*, and 3*e* between the bus-bar disconnectors 11, 12, 31, 32, 41, 42, 51, and 52, and the line disconnectors 14, 34, 44, and 54, and the polarity of the connection bus-bar 3*b* between the bus-bars 21 and 22 in the communication bus-bar circuit, can be left as positive, and its value can be reduced to at highest 0.5 pu, when the disconnecting operation is performed. Further, since the polarity of the connection bus-bars 3*a*, 3*c*, 3*d*, and 3*e* is positive, a metallic extraneous substance on the inside bottom face of the tank hardly adheres to the conductor in each of the connection bus-bars 3*a*, 3*c*, 3*d*, and 3*e*.

Figure 3:
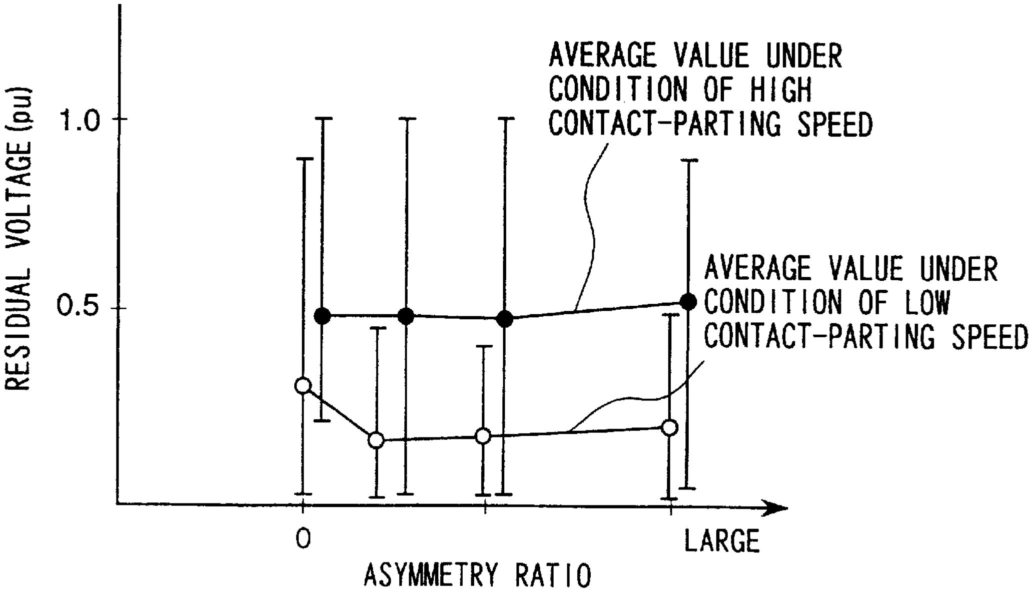
FIG. 3 is a graph showing the relationship between a residual voltage and the asymmetric ratio concerning the insulation recovery voltage.

FIG. 3 shows the relationship between a residual voltage and the asymmetric ratio concerning the insulation recovery voltage. In this figure, a black solid circle and a vertical bar indicate an average value and a dispersion value of each residual voltage, respectively, under the condition of a contact-parting speed of about 20 pu/s. Further, a circle and a vertical bar indicate an average value and a dispersion value of each residual voltage, respectively, under the condition of a contact-parting speed of about 2 pu/s. In the interrupting operation of the disconnectors, since the contact-parting speed is low, the re-ignition of arc is repeated, which causes the residual voltage. The asymmetry ratio $\eta$ is defined as a quantity representing the asymmetry in the insulation recovery speed, and is expressed by the following equation, that is: $\eta=\{(|a0+b0|)/|b0|\}\times 100$, where a0 and b0 whose unit is pu/s are average speed values of the insulation recovery with respective to a positive voltage and a negative voltage, respectively, and $a0>0$ and $b0<0$. From FIG. 3, it is seen that if the contact-parting speed in a disconnector is low, the value of the residual voltage is small, and the value of the dispersion of the generated residual voltage is also small.

Figure 4:
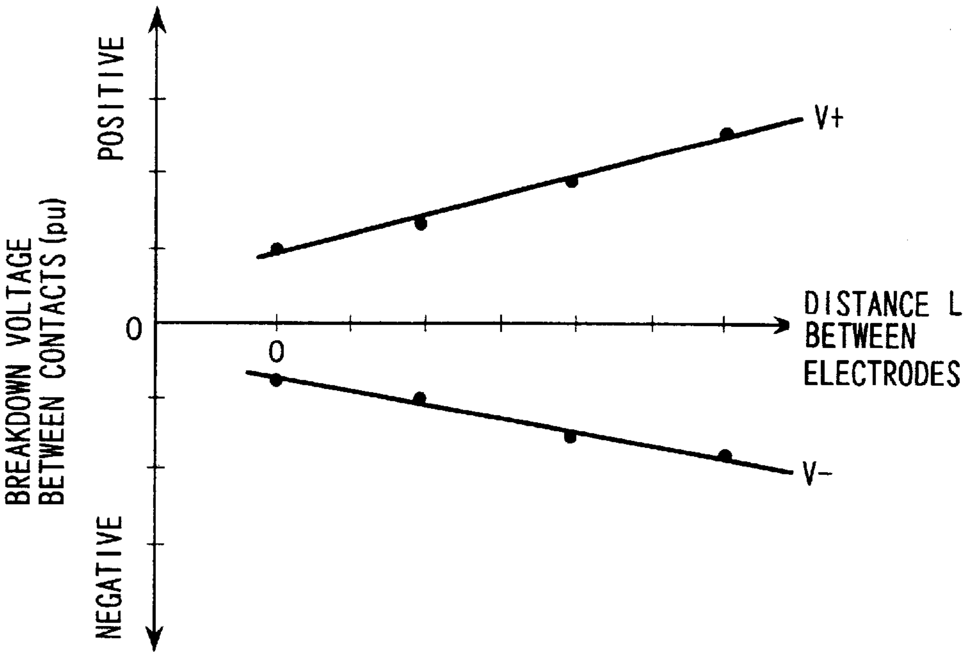
FIG. 4 is a graph showing the relationship between a breakdown voltage between contacts and the distance between the contacts.

FIG. 4 shows the relationship between a breakdown voltage between the contacts and the distance between the contacts. As shown in FIG. 4, the longer the distance between the contacts is, the higher the breakdown voltage between the contacts becomes. Moreover, the absolute value of the positive breakdown voltage V+ is larger than that of the negative breakdown voltage V−. That is, it is highly probable that after the disconnecting operation with repetition of the re-ignition of arc has terminated, a positive insulation voltage remains.

Figure 5:
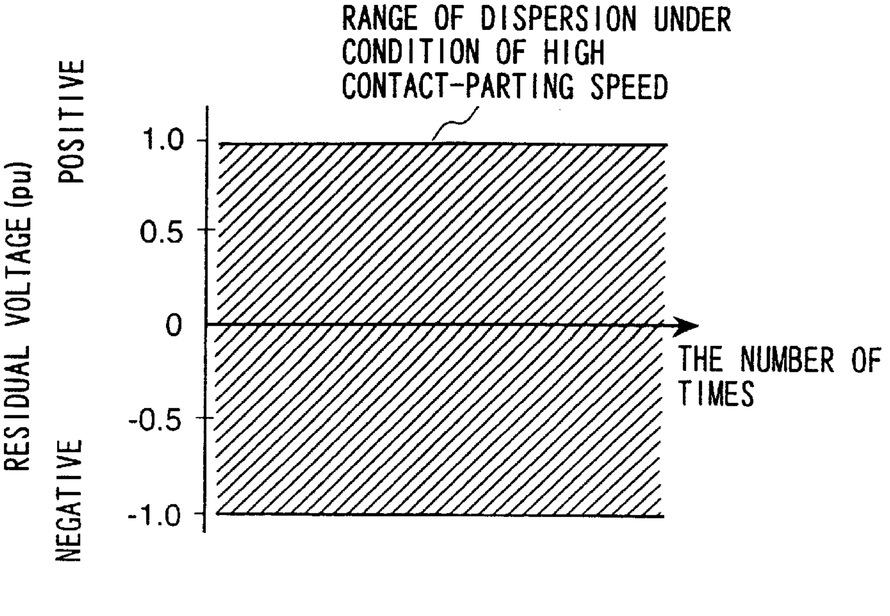
FIG. 5 is a graph showing the relationship between a residual voltage and its polarity under the condition of high contact-parting speed.
Figure 6:
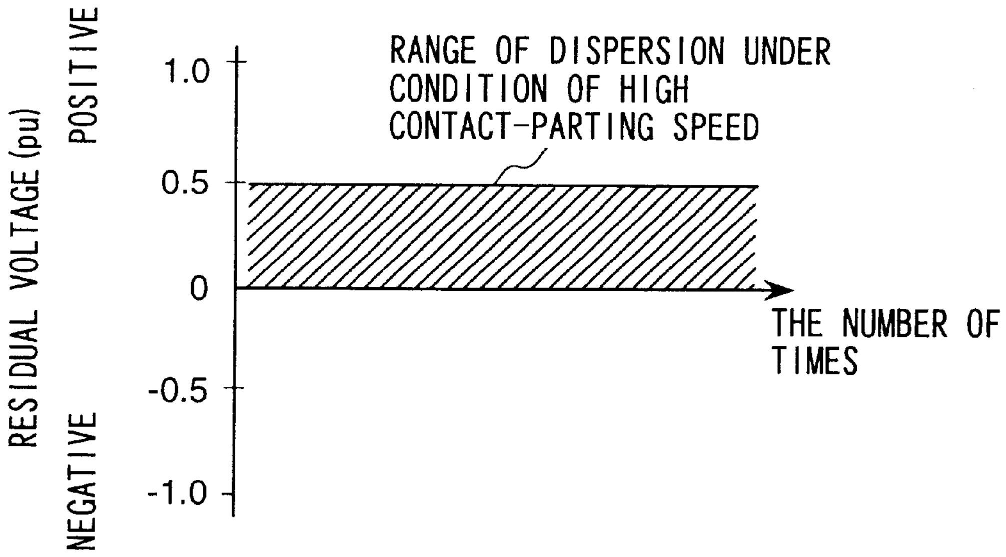
FIG. 6 is a graph showing the relationship between a residual voltage and its polarity under the condition of low contact-parting speed.

FIG. 5 shows the relationship between a residual voltage and its polarity under the condition of high contact-parting speed, and FIG. 6 shows the relationship between a residual voltage and its polarity under the condition of low contact-parting speed. As shown in FIG. 5, if the contact-parting speed is as high as about 1–3 m/s, the probability that the polarity of the residual voltage becomes positive is equal to the probability that the polarity of the residual voltage becomes positive, and the maximum value of the residual voltage is about 1 pu. As shown in FIG. 6, if the contact-parting speed is as low as about 0.1–0.3 nm/s, the polarity of the residual voltage probably becomes positive, and the residual voltage can be reduced below about 0.5 pu. That is, by decreasing the contact-parting speed in a line disconnector, it is possible to make the polarity of the voltage between the contacts positive and reduce the residual voltage to a low level.

As described above, in accordance with the gas-insulated electrical apparatus of the present invention, since the residual voltage between a disconnector and a circuit breaker due to a disconnecting operation of the disconnector can be reduced, it is possible to provide a highly reliable gas-insulated electrical apparatus in which a grounding accident scarcely occurs even if a metallic extraneous substance is in a tank, and the gas-insulated electrical apparatus of the present invention is very effectively applied to a power substation or a switching station.

What is claimed is:

1. A gas-insulated electrical apparatus comprising:

tanks into each of which an insulation gas is sealed, each tank containing therein bus-bars, bus-bar disconnectors connected to said bus-bars, circuit breakers connected to said bus-bar disconnectors, and line disconnectors connected to said circuit breakers, each line disconnector being also connected to a transmission line or a transformer;

a plurality of first switching devices, each connected to switch a respective one of said bus-bar disconnectors; and a plurality of second switching devices, each connected to switch a respective one of said line disconnectors with a moving-contact parting speed that is lower than a moving-contact parting speed of each of said plurality of first switching devices.

2. A gas-insulated electrical apparatus according to claim 1, wherein each bus-bar disconnector and each line disconnector include respective pairs of fixed and moving-contacts, said fixed-contact in said bus-bar disconnector is located at the side of a corresponding bus-bar connected to said bus-bar disconnector, said moving contact in said bus-bar disconnector is located at the side of a corresponding circuit breaker connected to said bus-bar disconnector via a connection busbar, said fixed-contact in said line disconnector is located at the side of a transmission line or a transformer connected to said line disconnector, and said moving-contact in line disconnector is located at the side of a corresponding circuit breaker connected to said line disconnector.

3. A gas-insulated electrical apparatus according to claim 1, wherein the moving-contact parting speed in each line disconnector is in a range of about 0.1–0.3 m/s.

4. A gas-insulated electrical apparatus comprising:

tanks into each of which an insulation gas is sealed, each tank containing therein bus-bars, bus-bar disconnectors connected to said bus-bars, circuir breakers connected to said bus-bar disconnectors, and line disconnectors connected to said circuit breakers, each line disconnector being further connected to a transmission line or a transformer;

wherein each bus-bar disconnector and each line disconnector include respective pairs of fixed- and moving-contacts, each said fixed-contact and moving-contact being shaped concave or convex, respectively, and each of said moving-contacts in said bus-bar disconnector and said line disconnector is connected to a corresponding circuit breaker between said bus-bar disconnector and said line disconnector.

5. A gas-insulated electrical apparatus comprising:

tanks into each of which an insulation gas is sealed, each tank containing therein bus-bars, bus-bar disconnectors connected to said bus-bars, circuit breakers connected to said bus-bar disconnectors, and ine disconnectors connected to said circuit breakers, each line disconnector being further connected to a transmission line or a transformer;

wherein each bus-bar disconnector and each line disconnector include respective pairs of fixed- and moving-contacts, said fixed-contact is a said bus-bar disconnector is located at the side of a corresponding bus-bar connected to said bus-bar disconnector, said moving-contact in said bus-bar disconnector is located at the side of a corresponding circuit breaker connected to said bus-bar disconnector via a connection bus-bar, said fixed-contact in said line disconnector is located at the side of a transmission line or a transformer connected to said line disconnector, and said moving-contact in said line disconnector is located at the side or a corresponding circuit breaker connected to said line disconnector.

6. A gas-insulated electrical apparatus according to claim 4, wherein each of said plurality of first switching devices is an electromotive spring operation device, and each of said plurality of second switching devices is a motor-driven-contact operation device.

7. A gas-insulated electrical apparatus according to claim 5, wherein each of said plurality of first switching devices is an electromotive spring operation device, and each of said plurality of second switching devices is a motor-driven-contact operation device.

* * * * *